United States Patent Office 3,387,023
Patented June 4, 1968

3,387,023
A-NOR-D-HOMOSTEROIDS
Seymour D. Levine, North Brunswick, N.J., assignor to E. R. Squibb & Sons, Inc., New York, N.Y., a corporation of Delaware
No Drawing. Filed Mar. 17, 1966, Ser. No. 535,055
5 Claims. (Cl. 260—488)

This invention relates to and has as its object the provision of new physiologically active steroids, processes for their production and novel intermediates useful in the preparation thereof.

More particularly, this invention relates to A-nor-D-homosteroids having the formula

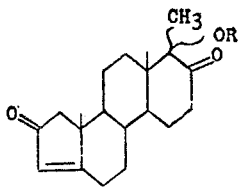

wherein R is selected from the group consisting of hydrogen and acyl.

The preferred acyl radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The novel compounds of this invention are pharmacologically active substances which possess anti-androgenic activity (i.e., they inhibit the actions of androgens), and which may be used in the treatment of such conditions as hyperandrogenic acne.

The compounds may be formulated for such administration, and concentration and/or dosage being based on the activity of the particular compound and the requirements of the patient.

The compounds of this invention may be prepared according to the processes of this invention beginning with 17α-hydroxy-A-norprogesterone. This starting material may be prepared by the process disclosed in copending U.S. patent application, Ser. No. 399,838, filed Sept. 28, 1964.

It has been discovered that when 17α-hydroxy-A-norprogesterone is treated with an alcoholic solution of potassium hydroxide the 17aα-methyl-17aβ-ol and the 17aβ-methyl-17aα-ol compounds of this invention are obtained.

These compounds may be acylated by treating the hydroxy compound with the requisite acid anhydride in the presence of perchloric acid.

The following examples illustrate this invention; all temperatures are in degrees centigrade unless otherwise stated:

Example 1.—17aα-methyl-Δ³-A-nor-D-homoandrostene-2, 17-dione-17aβ-ol; 17aβ-methyl-Δ³-A-nor-D-homoandrostene-2,17-dione-17aα-ol A solution of 500 mg. of 17α-hydroxy-A-norprogesterone in 300 ml. of ethanol and 300 ml. of 10% potassium hydroxide solution is refluxed for five hours and then extracted with ethyl acetate. The ethyl acetate extracts are washed with 8% salt solution, dried (sodium sulfate) and evaporated to dryness. The residue is a mixture of the title compounds which can be separated by plate chromatography using neutral alumina (Activity V) as the adsorbent and chloroform as the developing solvent.

Example 2.—17aα-methyl-Δ³-A-nor-D-homoandrostene-2, 17-dione-17aβ-acetate

Utilizing 17aα-methyl-Δ³-A-nor-D-homoandrostene-2, 17-dione-17aβ-ol and treating it with acetic anhydride in the presence of perchloric acid, the product formed is 17aα - methyl - Δ³ - A - nor - D - homoandrostene - 2, 17-dione-17aβ-acetate.

Example 3.—17aβ-methyl-Δ³-A-nor-D-homoandrostene-2, 17-dione-17aα-ol 17-acetate

Utilizing 17aα-methyl-Δ³-A-nor-D-homoandrostene-2, 17-dione-17aα-ol and treating it with acetic anhydride in the presence of perchloric acid, the product formed is 17aβ - methyl - Δ³ - nor - D - homoandrostane - 2,17 - dione-17aα-ol.

The invention may be variously otherwise embodied within the scope of the appended claims.

What is claimed is:
1. A compound having the formula

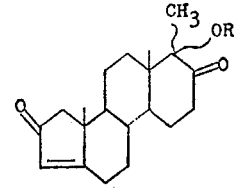

wherein R is selected from the group consisting of hydrogen and acyl derived from hydrocarbon carboxylic acids having less than 12 carbon atoms.

2. A compound in accordance with the formula of claim 1 having the name 17aα-methyl-Δ³-A-nor-D-homoandrostene-2,17-dione-17aβ-ol.

3. A compound in accordance with the formula of claim 1 having the name 17aβ-methyl-Δ³-A-nor-D-homoandrostene 2,17-dione-17aα-ol.

4. A compound in accordance with the formula of claim 1 having the name 17aα-methyl-Δ³-A-nor-D-homoandrostene-2,17-dione-17aβ-acetate.

5. A compound in accordance with the formula of claim 1 having the name 17aβ-methyl-Δ³-A-nor-D-homoandrostene-2-17-dione-17aα-ol 17-acetate.

References Cited

UNITED STATES PATENTS 3,024,271   3/1962   Amiard et al. _____ 260—476
3,194,832   7/1965   Reimann et al. _____ 260—488

LORRAINE A. WEINBERGER, Primary Examiner.
VIVIAN GARNER, Assistant Examiner.